United States Patent [19]

Trouve

[11] Patent Number: 5,395,440
[45] Date of Patent: Mar. 7, 1995

[54] COMPOSITIONS FOR THE TREATMENT OF PAPER AND/OR CARDBOARD SURFACES AND THEIR USE IN THE PAPER INDUSTRY

[75] Inventor: Claude Trouve, Yerres, France

[73] Assignee: Societe Francaise Hoechst, Puteaux, France

[21] Appl. No.: 109,429

[22] Filed: Aug. 20, 1993

[30] Foreign Application Priority Data

Jul. 5, 1993 [FR] France ................... 93 08198

[51] Int. Cl.$^6$ ................................. C09D 7/12
[52] U.S. Cl. .................... 106/287.25; 162/158
[58] Field of Search ............... 106/287.25; 162/158

[56] References Cited

U.S. PATENT DOCUMENTS

| | | | |
|---|---|---|---|
| 3,869,296 | 3/1975 | Kelly, Jr. et al. | 106/214 |
| 3,917,659 | 9/1975 | Glancy et al. | 260/555 |
| 4,343,655 | 8/1982 | Dodd et al. | 106/214 |
| 4,455,416 | 6/1984 | Floyd et al. | 528/245 |
| 4,471,087 | 9/1984 | Lipowski | 524/512 |

Primary Examiner—David Brunsman
Attorney, Agent, or Firm—Browdy and Neimark

[57] ABSTRACT

Compositions intended for the treatment of paper and cardboard surfaces characterized in that they have a pH of less than 6 and contain between 30 and 50% by weight of a mixture constituted by glyoxal (G), urea (U), an alkali metal salt of an oxygenated boron acid (A) and calcium hydroxide (D) in the following molar ratios $$0.1 \leq \frac{U}{G} \leq 2$$

$$0.01 \leq \frac{A}{G} \leq 0.5$$

$$0.1 \leq \frac{D}{A} \leq 1.3$$

coating baths containing this composition and treated papers.

6 Claims, No Drawings

COMPOSITIONS FOR THE TREATMENT OF PAPER AND/OR CARDBOARD SURFACES AND THEIR USE IN THE PAPER INDUSTRY

The present invention relates to compositions for the treatment of paper and/or cardboard surfaces and their use in the paper industry.

In the paper industry, it is known that the condition of the paper surface is modified as a function of the uses desired. Thus, for certain uses, in particular for offset printing, a paper is required which is not only rigid and opaque, but which also has a surface which produces good printing while possessing a good resistance to abrasion whilst moist, picking whilst moist, to fluffing and to dusting as well as a satisfactory dimensional stability vis-à-vis water. To achieve this, it has been proposed to treat papers with coating slips containing mineral pigments combined with binders: starch, casein, modified starch, SBR latex. In order to improve the resistance to water of the coatings thus obtained, it is known to introduce, into the coating slips, glyoxal, aminoplastic resins based on urea and/or melamine and glyoxal, formaldehyde or a glyoxalformaldehyde mixture, and sometimes zirconium salts (U.S. Pat. Nos. 3,869,296, 3,197,659, 4,343,655, 4,455,416 and 4,471,087). However, these known processes have a number of disadvantages, namely: glyoxal cannot be used in alkaline coating slips and, furthermore, papers coated with coating slips containing glyoxal in free or combined state yellow easily and cannot tolerate high drying temperatures. Aminoplastic resins containing formaldehyde release the latter during treatments, which makes their use incompatible with certain legislation. As for zirconium salts, they are practically ineffective with starches.

In order to eliminate these disadvantages, the Applicant has discovered new compositions which can be used in the treatment of paper and cardboard surfaces and which improve dimensional stability vis-à-vis water, resistance to abrasion whilst moist, to picking whilst moist, to dusting and to fluffing, without however reducing the whiteness of the papers treated.

The compositions according to the invention are characterized in that they contain, in aqueous solution, between 20 and 50% by weight of a mixture constituted by glyoxal, designated hereafter G, urea, designated hereafter U, an alkali metal salt of an oxygenated boron acid, designated hereafter A, and calcium hydroxide designated hereafter D, in quantities such that, on the one hand, the molar ratios of these various products comply with the following relationships:

$$0.1 \leq \frac{U}{G} \leq 2 \quad \text{(Rel. 1)}$$

$$0.01 \leq \frac{A}{G} \leq 0.5 \quad \text{(Rel. 2)}$$

$$0.1 \leq \frac{D}{A} \leq 1.3 \quad \text{(Rel. 3)}$$

and that the pH of the said composition is less than 7.

By "alkali metal salt of an oxygenated boron acid" is meant products A of formula (I):

$$M_2O,(B_2O_3)_m,nH_2O$$

in which M represents an alkali metal, m represents 1, 2 or 5 and n represents 2.5, 4, 5, 8 or 10. Among products A, there can be mentioned the alkali metal borates mentioned in the Encyclopedia of Chemical Technology, KIRK-OTHMER, 4th Edition, Vol. 4, page 383, John Wiley and Sons, New York. Preferably, product A is disodium tetraborate crystallized with 10 molecules of water, commonly called borax.

A more particular subject of the invention is the compositions as defined above characterized in that A is borax. Among the last-named compositions, there can be mentioned more particularly those which contain in aqueous solution, about 40±5% by weight of a mixture containing per 1 mole of glyoxal, 0.1 to 0.5 mole of urea, 0.01 to 0.2 mole of borax and a molar quantity of calcium hydroxide such that the pH of the composition is less than 7 and that the molar ratio D/A is comprised between 0.2 and 1.3.

The glyoxal and the urea contained in the compositions of the invention can be either in the free state, or in the combined state, or lastly partially combined together.

The compositions according to the invention are obtained by simple mixing of their constituents in water. Preferably, the compositions according to the invention are prepared from a commercial aqueous solution of glyoxal at 40% by weight, into which the desired quantities of urea, of A and finally of D are successively introduced under agitation at ambient temperature. Under even more preferred conditions, the compositions according to the invention are obtained by introducing the desired quantity of urea into the aqueous solution of glyoxal under agitation at ambient temperature, then when the solution obtained returns to ambient temperature, A and finally D are added.

The compositions according to the invention have useful properties when they are introduced into standard coating slips based on mineral pigments and binder(s), intended for coating paper. They allow in-particular the improvement of resistance to abrasion whilst moist, to picking whilst moist, to dusting and to fluffing as well of dimensional stability vis-à-vis water of papers treated with coating slips containing the compositions according to the invention. Furthermore, these improvements are obtained without harming the whiteness of the papers in spite of the fact that they contain glyoxal which is known for yellowing papers when drying conditions are severe. These properties justify their use in the paper industry for obtaining coating baths such as coating slips, and various size-press formulations intended in particular for sizing papers.

Also a subject of the invention is coating baths containing the above compositions, as well as papers obtained by the use of coating baths according to the invention.

The compositions according to the invention are incorporated in standard coating baths based on mineral pigments and binder(s), so as to obtain about 0.5±0.2 g of free and/or combined glyoxal per 100 g of mineral pigments used. They can also be used in making coating slips which can be used for obtaining decorative papers capable of being glued in particular on chip board in order to improve them.

The following examples illustrate the present invention without however limiting it.

EXAMPLE 1

In this example, a non-wood paper, sized and precoated, of 108 g/m², marketed by the Condat factory of the Saint-Gobain Company, is used. The coating of this paper was carried out with a deposit of about 10 g/m² on a Heliocoater MK IV machine from the Charlestown Engineering Company, at a speed of 600 m/min, with a tank blade, thickness 0,508 mm, angle 59°; the coating is followed by drying by infrared for 2 minutes with a rating of 36 KW. The whiteness of the coated paper was then determined with a DATACOLOR 3890 apparatus then the TABER abrasion whilst moist was determined.

The determination of the TABER abrasion whilst moist was carried out according to the modified French standard Q03-055, with annular test pieces of an outer and inner diameter of 120 and 7 mm respectively, for 20 revolutions, under a pressure of 100 g, in the presence of 10 g of water, followed by rinsing with 10 g of water; the 20 g of water is recovered and is made up to 25 g with water, then the turbidity of the 25 g of water is determined with a HACH turbidimeter. The turbidity found is expressed in NTU units (the lower the turbidity values are, the better the results).

The following are mixed under agitation, at ambient temperature:
- 145.1 g of a commercial aqueous solution of glyoxal at 40% by weight, that being one mole,
- 7.93 g (132 mmoles) of urea,
- 5.72 g (15 mmoles) of disodium tetraborate crystallized with 10 molecules of water,
- 1.33 g (18 mmoles) of calcium hydroxide,
- 8.6 g of water.

After agitation for 30 minutes at ambient temperature, 168.7 g of a clear solution is obtained having a pH of 3.5±0.5 and a dry extract of 42±1%. The molar ratio U/G is 0.132, the molar ratio disodium tetraborate/glyoxal, A/G, is 0,015 and the molar ratio D/A is 1.2.

EXAMPLES OF THE USE of the composition of Example 1

In these examples, the following are used: a kaolin marketed by the company ENGLISH CHINA CLAY, reference SPS, an SBR latex marketed by the company DOW CHEMICAL, reference DL 950, a carboxymethyl-cellulose, CMC, marketed by the company METSA-SERLA, reference Finfix $^R$ 10, polyvinyl alcohol marketed by the Applicant, reference Mowiol $^R$ 4-98, an optical bleach marketed by the company BAYER AG, reference Blankophor $^R$ P, a calcium carbonate marketed by the company OMYA, reference Hydrocarb $^R$ 90, an oxidized starch, marketed by the company DOITTEAU, reference Amisol $^R$ 5591.

Starting with these products, 4 coating slips are prepared designated C1, C2, C3 and C4, of which the composition of dry parts, dry extract and pH adjusted to the value indicated with 20% soda are given in Table I.

TABLE I

|  | C1 | C2 | C3 | C4 |
|---|---|---|---|---|
| KAOLIN | 100 | 0 | 100 | 0 |
| CALCIUM CARBONATE | 0 | 100 | 0 | 100 |
| SBR LATEX | 10 | 10 | 6 | 6 |
| CMC | 1 | 1 | 0 | 0 |
| OXIDIZED STARCH | 0 | 0 | 6 | 6 |
| POLYVINYL ALCOHOL | 0.4 | 0.4 | 0.45 | 0.45 |
| OPTICAL BLEACH | 0.45 | 0.45 | 0.45 | 0.45 |
| DRY EXTRACT (%) | 58.5 | 61.5 | 58.5 | 61.5 |
| pH | 8.5 | 8.5 | 8.5 | 8.5 |

With these 4 coating slips, C1–C4, operations were carried out for coating paper, without additive, then the following were introduced into these 4 coating slips relative to 100 dry pigment parts: either 1.5 g of the composition prepared in Example 1, designated Ex. 1, or 1.5 g of a commercial aqueous solution of glyoxal at 40% by weight, designated S2, or 1 g, 1.29 g or 1.5 g of a commercial aqueous solution containing, 48.5% by weight of a urea-glyoxal aminoplastic resin with a molar ratio U/G of 0.4, designated S1.

On the coated papers obtained by these 24 tests, having identical deposits of about 10 g/m², the TABER abrasion whilst moist, designated TABER, and the whiteness with or without ultraviolet, were determined. The results found are given in Table II in which the variation in the values of the pH of the coating slips used after 24 hours storage, expressed in pH units, was also mentioned. In all cases, a reduction in the pH of these slips was noted.

Analysis of the results mentioned in Table II shows that, relative to coating slips prepared according to the techniques of the prior art, at an equivalent dose of free or combined glyoxal, the compositions according to the invention allow a coated paper to be obtained which has an excellent whiteness and an improved resistance to abrasion whilst moist.

EXAMPLE 2

The following are mixed under agitation at 20±2° C.:
- 145.1 g of a commercial aqueous solution of glyoxal at 40% by weight, that being one mole of glyoxal,
- 25.03 g of urea, that being 417 mmoles, then the following are introduced successively into the solution obtained, under agitation and at 20±2° C.:
- 46.07 g (121 mmoles) of disodium tetraborate crystallized with 10 molecules of water,
- 2.81 g (38 mmoles) of calcium hydroxide,
- 70.72 g of water.

After agitation for 30 minutes at ambient temperature, 289.7 g of a clear solution is obtained, designated Ex2, which has a pH of 5.5 and a dry extract of about 39±1%.

The molar ratio U/G is 0.417, the molar ratio A/G is 0.121 and the molar ratio D/A is 0.314.

Three coating slips are prepared, designated C5–C7 containing 20 g of ACRONAL $^R$ 305 D, a binder for paper marketed by the company B.A.S.F. A.G., and either 5 g of the Ex2 composition prepared above (C5), or 5 g of urea-glyoxal aminoplastic resin S1 used previously (C6), or finally no additive (C7).

Starting with these three coating slips C5–C7, and according to the process described previously, a deposit of 12 g/m² was produced on a decorative paper support, followed by drying for 2 minutes at 120° C.

The following were then carried out on samples of paper coated with slips C5–C7: a whiteness test (without UV) and the COBB test (duration 60 seconds) according to the French standard NF Q03-035: determination of the water absorption, on samples as they are and on samples calendered at 80° C. The results of these tests are given in Table III.

TABLE III

|  | C5 | C6 | C7 |
|---|---|---|---|
| Whiteness without UV (%) | 89.6 | 81.6 | 89.5 |
| COBB without calendering (g/m²) | 13 | 7.5 | 32.6 |
| COBB with calendering (g/m²) | 8.5 | 7.5 | 10 |

Analysis of the results given in Table III shows that the composition according to the invention allows good results to be obtained simultaneously both for whiteness (high whiteness) and for water absorption (low water absorption).

TABLE II

| Additives | C1 | | | | | | C2 | | | | | |
|---|---|---|---|---|---|---|---|---|---|---|---|---|
| | | Ex. 1 | S1 | S2 | | | | Ex. 1 | S1 | S2 | | |
| Doses | 0 | 1.5 | 1.5 | 1 | 1.29 | 1.5 | 0 | 1.5 | 1.5 | 1 | 1.29 | 1.5 |
| TABER (NTU) | 208 | 85 | 120 | 115 | 102 | 98 | 345 | 182 | 222 | 200 | 190 | 177 |
| Whiteness without UV (%) | 81.6 | 81.2 | 81.0 | 81.1 | 81 | 80.8 | 87.3 | 87.4 | 87.1 | 86.9 | 86.8 | 86.7 |
| Whiteness with UV (%) | 98.2 | 97.6 | 98.1 | 97.6 | 97.5 | 97.1 | 110.5 | 110.4 | 110.6 | 109.9 | 109.7 | 109.6 |
| Variations in pH | −0.3 | −0.5 | −0.8 | −0.8 | −0.9 | −1 | −0.2 | −0.5 | −0.4 | −0.9 | −1 | −1 |
| Additives | C3 | | | | | | C4 | | | | | |
| | | Ex. 1 | S1 | S2 | | | | Ex. 1 | S1 | S2 | | |
| Doses | 0 | 1.5 | 1.5 | 1 | 1.29 | 1.5 | 0 | 1.5 | 1.5 | 1 | 1.29 | 1.5 |
| TABER (NTU) | 638 | 87 | 114 | 102 | 95 | 79 | 1517 | 397 | 475 | 410 | 400 | 395 |
| Whiteness without UV (%) | 82.3 | 82.2 | 82.3 | 81.8 | 81.7 | 81.7 | 86.9 | 86.7 | 86.8 | 86.3 | 86.2 | 86.1 |
| Whiteness with UV (%) | 97.6 | 97.3 | 97.1 | 97.1 | 97.0 | 96.8 | 110.9 | 110.8 | 110.7 | 110.1 | 110 | 110 |
| Variations in pH | −0.4 | −0.7 | −0.6 | −0.9 | −1.2 | −1.4 | −0.3 | −0.6 | −0.4 | −1 | −1 | −1.2 |

I claim:

1. Composition intended for the treatment of paper and cardboard surfaces characterized in that they have a pH of less than 7 and that it contains between 30 and 50% by weight of a mixture constituted by glyoxal (G), urea (U), an alkali metal salt of an oxygenated boron acid (A) and calcium hydroxide (D) in the following molar ratios:

$$0.1 \leq \frac{U}{G} \leq 2$$

$$0.01 \leq \frac{A}{G} \leq 0.5$$

$$0.1 \leq \frac{D}{A} \leq 1.3$$

2. Compositions according to claim 1, characterized in that the alkali metal salt of an oxygenated boron acid is disodium tetraborate.

3. Compositions according to claim 2, characterized in that they contain in aqueous solution 40±5% of a mixture containing per 1 mole of glyoxal, 0.1 to 0.5 mole of urea, 0.01 to 0.2 mole of disodium tetraborate and 0.2 to 1.3 mole of calcium hydroxide per mole of disodium tetraborate.

4. An aqueous coating bath for paper or paperboard containing a composition according to claim 2.

5. An aqueous coating bath for paper or paperboard containing a composition according to claim 3.

6. Coating baths for papers and cardboards characterized in that they contain a composition according to claim 1.

* * * * *